United States Patent [19]

Nielsen

[11] Patent Number: 4,473,781
[45] Date of Patent: Sep. 25, 1984

[54] CONTROL DEVICE FOR A BRUSHLESS D. C. MOTOR

[75] Inventor: Henrik B. Nielsen, Nordborg, Denmark

[73] Assignee: Danfoss A/S, Nordborg, Denmark

[21] Appl. No.: 408,252

[22] Filed: Aug. 16, 1982

Related U.S. Application Data

[63] Continuation of Ser. No. 228,101, Jan. 26, 1981, abandoned.

[30] Foreign Application Priority Data

Feb. 1, 1980 [DE] Fed. Rep. of Germany ....... 3003583

[51] Int. Cl.$^3$ .......................................... H02P 6/02
[52] U.S. Cl. .................................. 318/254; 318/138; 318/439
[58] Field of Search .................. 318/138, 254, 439

[56] References Cited

U.S. PATENT DOCUMENTS 4,085,355  4/1978  Fradella .............................. 318/168
4,270,076  5/1981  Nygaard ......................... 318/138 X Primary Examiner—J. V. Truhe
Assistant Examiner—Saul M. Bergmann
Attorney, Agent, or Firm—Wayne B. Easton

[57] ABSTRACT

The invention relates to a control unit for a brushless D.C. motor having at least two stator windings controlled by semiconductor switching elements and a chopper. To avoid having extinguishing current pulses damage the chopper there is provided controls whereby the motor regulating waveform for controlling the chopper is effectively blocked during the active intervals of the extinguishing current pulses.

13 Claims, 2 Drawing Figures

CONTROL DEVICE FOR A BRUSHLESS D. C. MOTOR

This application is a continuation of application Ser. No. 228,101, filed Jan. 26, 1981, now abandoned.

The invention relates to a control device for a brushless D.C. motor having at least two stator windings, comprising semiconductor switching elements, a chopper, a choke coil between the semiconductor switching elements and the chopper, a sensor for detecting the rotary position of the rotor, a commutation control unit for the semiconductor elements controllable by the sensor, a chopper control stage with a transmission path for operating signals upstream of the control input of the chopper control stage, and current measuring means by which the chopper is controllable in response to the motor current by way of the chopper control stage, wherein each series circuit of a semiconductor switching element, the choke coil and the chopper is connectible in series with a respective stator coil to the D.C. operating voltage source.

In a known control device of this kind, a rotary angle sensor subjected to the stator field initiates commutation (switching-over) of the semiconductor switching elements. The pulse-duty factor of the chopper is automatically controlled by way of the control stage in dependence on the current and the speed of the motor so that they correspond to the predetermined desired values. The semiconductor switching elements are transistors. However, they often have an inadequate switching capacity and a comparatively high power loss.

It is known as disclosed in U.S. Pat. No. 4,270,076 to use thyristors instead of transistors as the switching elements so as to increase the switching performance but difficulties are encountered during the commutation and extinction of the thyristors. When operation of the chopper coincides with the commutation or extinction, there is a danger that the chopper current or motor current, especially in a case where the latter is already high, exceeds a maximum limiting value so that the chopper is switched off or blocked. The consequence of this would be a reduction in the motor output because the blocking time determines the mean value of the motor current and blockage can extend over an entire period of the chopper frequency and be repeated within a commutation period.

When the chopper is formed by a thyristor, it is usual to ignite same with a short pulse (having a duration of about one microsecond) and a subsequent constant lower pulse. If this ignition signal coincides with an overcurrent signal which is initiated by simultaneous commutation of the phase thyristors and initiates extinction of the chopper thyristor, the chopper thyristor could be immediately re-ignited so that it is nevertheless destroyed by the overcurrent.

The invention is based on the problem of providing a control device of the aforementioned kind which permits a higher control performance to be obtained with less power loss and reliable operation.

According to the invention, this problem is solved in that each semiconductor switching element comprises a controllable two-way rectifier device and is in series with a diode, that the junctions of the diode and two-way rectifier device of the successive phases in the switching sequence are connected by an extinguishing circuit comprising an extinguishing coil and an extinguishing condenser in series, and that the commutation control unit feeds a signal for blocking the chopper to the transmission path at the instant of commutation.

In this construction of the control device for the D.C. motor one prevents part of the extinguishing current from flowing through and overloading the chopper during commutation so that it might be switched off and blocked by reason of maximum current limiting means. Compulsory blockage of the chopper prevents such switching off on an overcurrent and at the same time ensures positive extinction of the thyristors during commutation.

The duration of the blocking signal should be selected so that the extinguishing current has dropped to below a permissible value during it.

A particularly simple construction of the control device is one where an operating signal is overridable by a blocking signal when both signals coincide.

This can be achieved in that the transmission path comprises a linking element on the input side with two inputs, that the blocking signals can be fed to the one input and the operating signals to the other, and that the linking element permits the operating and blocking signals to pass, but only the blocking signal upon coincidence.

When a switching transistor is used as the chopper, it is generally provided with an RCD protective circuit or a suitable other protective circuit. If, then, the operating signal of the chopper over-modulated by the blocking signal during the coincidence is shortened until the switching transistor is blocked again immediately after operation, this can lead to very high reversing currents through the switching transistor which nevertheless destroy the switching transistor. Preferably, therefore, the transmission path has a pulse former on the output side that, for an input pulse exceeding a minimum duration, produces an output pulse of a duration corresponding to the input pulse and, for an input pulse under the minimum duration, produces an output pulse having the minimum duration. In this way one ensures that the switching transistor is nevertheless operated during this minimum duration which is such that excessively high reversal currents are avoided.

The pulse former can comprise an OR linking element with two inputs of which one input is connected to the other by way of a time switching element with an operating time corresponding to the minimum duration and forms the input of the pulse former. In this way, the input pulse of the pulse former or the output pulse of the time switching element very simply determines the duration of the pulse former output pulses, depending on which of the two pulses is longer.

Preferably, the operating signals are width-modulated pulses depending on a control signal which determines the motor speed.

A preferred example of the invention will now be described in more detail with reference to the drawing, wherein.

Figure 1:
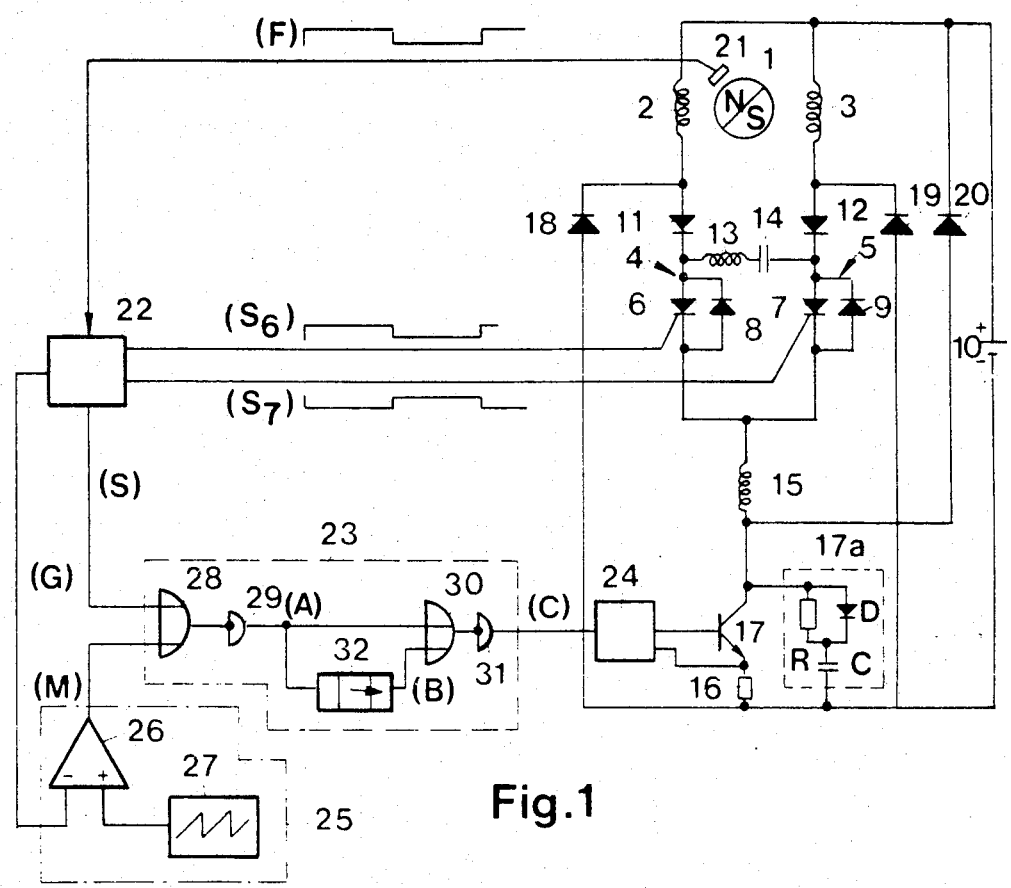
FIG. 1 is a circuit diagram of a control device according to the invention.

FIG. 1 represents a control device for a brushless D.C. motor with a two-pole permanent magnet rotor 1 and two stator windings 2 and 3. The stator windings 2, 3 are respectively in series with a semiconductor switching element in the form of a controllable two-way rectifier device 4 or 5 consisting of a thyristor 6 or 7 (also termed 'rearwardly blocking thyristor triode')

and a anti-parallel-connected diode 8 or 9 between the poles (+) and (−) of a D.C. operating voltage source 10.

Between the controllable two-way rectifier devices 4, 5 and the stator windings 2, 3 there is in each case a diode 11 or 12 poled in the same sense as the thyristors 6, 7. The connections of the diodes 11, 12 to the thyristors 6 or 7 are joined by an extinguishing circuit comprising an extinguishing coil 13 and an extinguishing condenser 14 in series circuit.

The series circuit formed by the stator winding 2, diode 11 and two-way rectifier device 4 as well as the series circuit formed by the stator winding 3, diode 12 and two-way rectifier device 5 are together in series with a series circuit consisting of a choke coil 15, a current measuring device 16 in the form of an ohmic resistor and a chopper 17 in the form of a switching transistor with protective circuit 17a. The protective circuit 17 prevents a high pass voltage from being applied between the collector and emitter during blockage of the transistor that produces an overload until the transistor is finally blocked. For this purpose the protective circuit 17a can be an RCD protective circuit as illustrated.

Two further diodes 10 and 19 respectively connect the negative pole of the operating voltage source 10 to the connections of the stator winding 2 and diode 11 or stator winding 3 and diode 12. The junction of the choke coil 15 and current measuring device 16 is connected by way of a feedback diode 20 to the positive pole of the D.C. operating voltage source 10.

A sensor 21 measures the rotary position of the rotor 1. It produces a rectangular signal F which changes its amplitude after each half-rotation of the rotor 1. The sensor signal F is fed to a commutation control unit 22 which derives therefrom switching signals $S_6$, $S_7$ for the thyristors 6 and 7 displaced in phase by 180° so that the thyristors are operated (brought to the conductive state) after each half-rotation of the rotor.

In addition, the commutation control unit 22 is connected to the control input of the chopper 17 by a transmission path 23 in the form of a linking arrangement and a chopper control stage 24. The commutation control unit 22 feeds to a pulse width modulator 25 a D.C. control voltage G which is proportional to the rotary speed of the rotor 1, is transformed by the pulse width modulator 25 into a pulse width modulated (on-off) switching signal M and fed to a second input of the transmission path 23. For this purpose the pulse width modulator 25 contains a comparator 26 in the form of a differential amplifier of high amplification and a sawtooth pulse generator 27. The comparator 26 receives the D.C. control voltage G at its reversing input (−) and the sawtooth pulse generator 27 at its one-reversing input (+). Every time the sawtooth pulse exceeds the D.C. control voltage G, the comparator 25 produces a switching off or blocking signal $M_1$ and in other cases an on or operating signal $M_0$ for the chopper 17.

The input side of the transmission path 23 contains an OR linking element 23 with two inputs and a downstream NOT element 29, which together form a NOR linking element. On the output side, the transmission path 23 likewise contains an OR linking element 30 with two inputs and a downstream NOT element 31, which together form a NOR linking element. The output of the NOT element 29 is connected directly to the one input of the OR linking element 30 and by way of a time switching element 32 to the other input. The elements 30, 31 and 32 form a pulse former which ensures a minimum duration for the output pulse $C_0$.

Apart from the output signal C of the transmission path 23, the chopper control stage 24 contains the measuring signal of the current measuring device 16 and brings about blockage of the chopper 17 when the signal C is a 1 signal $C_1$ and/or the current measuring signal exceeds and upper limiting value.

During operation (also see FIG. 2) it is assumed that the switching signal $S_6$ is positive. During this time the thyristor 6 is then operated and the thyristor 7 blocked. The chopper 17 is operated during each 0 signal $C_0$ so that a motor operating current flows through the components 2, 11, 6, 15, 16 and 17 and a further current through the components 3, 12, 14, 13, $6_1$, 15, 16 and 17. The further current charges the extinguishing condenser 14. As soon as the switching signal $S_6$ becomes 0, the switching signal $S_7$ becomes positive so that the thyristor 7 is also operated and the extinguishing condenser 14 discharges by way of the thyristor 7, the diode 8 and the extinguishing coil 13. The voltage drop at the diode 8 caused by the discharging current $I_L$ extinguishes the thyristor 6 so that an operating current will now flow through the stator winding 3 upon the occurrence of an 0 signal $C_0$. During extinction of the thyristor 6, the diode 12 prevents discharge of the extinguishing condenser 14 into the D.C. operating voltage source 10. The same applies to the diode 11 during the next half-rotation of the rotor. The diode 19 permits the energy stored in the stator winding 2 after blocking of the thyristor 6 to be returned to the D.C. operating voltage source 10 by way of the stator winding 3 by reason of the magnetic coupling of the two stator windings 2 and 3. The same applies to the diode 18, the thyristor 7 and the stator winding 3.

When the chopper 17 is operated or made to be operated during commutation of the conductive condition of the thyristors 6 and 7, the extinguishing condenser 14 could become discharged not by way of the thyristor which has just become conductive but at least partially also by way of the chopper 17 and the corresponding diode 18, 11 or 19, 12. In addition, both thyristors could be momentarily simultaneously conductive because the delay in extinguishing the thyristor that is to be extinguished is somewhat longer than the delay in igniting the thyristor that is to be ignited. Both conitions can lead to an overcurrent in the chopper 17, particularly when the current flowing through the chopper 17 is in any case high, with the result that the chopper 17 is immediately blocked again by way of the current measuring device 16 and the chopper control stage 24 and the operating current is interrupted. This interruption produces a reduction in the mean operating current value to below the desired value, which could lead to a marked reduction in the motor output if the interruption is repeated within a commutation period and/or extends over a full period of the chopper frequency which, however, is considerably higher than the highest frequency of the switching signals $S_6$ and $S_7$ or the rotary speed of the motor. In addition, there would be the danger of the extinguishing circuit no longer being functionable because of inadequate discharging of the extinguishing condenser 14 with the chopper 17 blocked.

To remedy this, the commutation control unit 22 produces a signal S which forms a blocking signal $S_1$ (a 1 signal in the form of a positive pulse) upon each commutation of the thyristors 6 and 7. The duration of this blocking signal $S_1$ is chosen to be only so short that the discharging or extinguishing current $I_L$ of the extinguishing circuit can drop off.

The signal S is then fed to the one input of the OR linking element 28 and the pulse width-modulated signal M is fed to the other input. The signal A at the output of the NOT element 29 is thus a 1 signal $A_1$ only when both signals S and M are 0 signals $S_0$ and $M_0$. The 1 signal $A_1$ is fed to the chopper control stage 24 by way of the OR linking element 30 and the NOT element 31 as an 0 signal $C_0$, the presence of the time switching element 32 and the associated input to the OR gate 30 being firmly disregarded, and operates the chopper 17 (renders it conductive) by way of this chopper control stage 24. When the operating signal $M_0$ for the chopper 17 (coincidentally) occurs during the commutation (switching-over) of the thyristors 6 and 7, as is shown at the middle of the course of the signal M in FIG. 2, so that it operates the chopper 17 during commutation (without the 1 signal $S_1$), the simultaneously occurring blocking signal $S_1$ effects blockage (or over-modulation) of the operating signal $M_0$ (or of the 1 signal $A_1$) through the NOR linking element 28, 29 for the duration of the ovrlap of the blocking signal $S_1$ and operating signal $M_0$. Only a 1 signal $A_1$ shortened by the duration of overlap is thus effective (see the course of the signal A in the middle of FIG. 2). The chopper 17 is therefore not operated during the existence of the blocking signal $S_1$ (if no time switching element 32 is present). Accordingly, for the duration of the blocking signal $S_1$, the extinguishing current $I_L$ cannot flow through the chopper 17.

Figure 2:
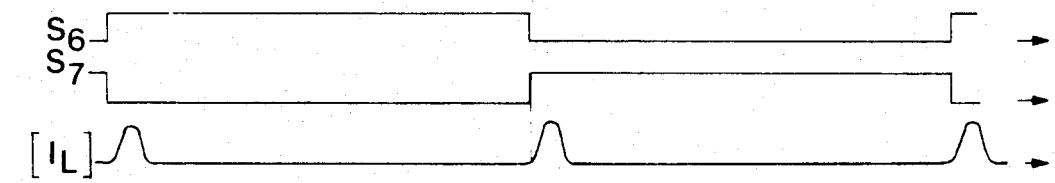
FIG. 2 is a pulse diagram to explain the function of the FIG. 1 control device.
Figure 2:
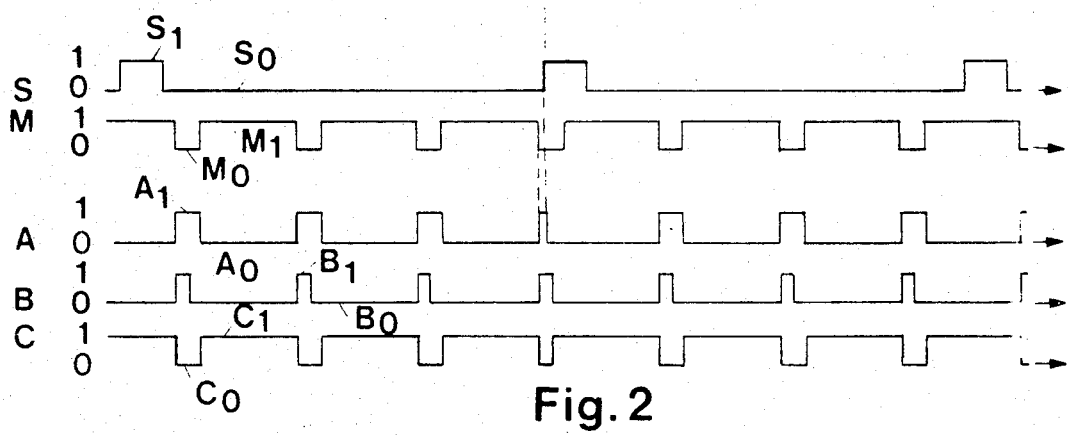

However, the signal $A_1$ can now become very short (without the time switching element 32) as is shown in the middle of the course for the signal A in FIG. 2. If the chopper 17 is in the form of a transistor as in the present case, it is blocked again immediately after being operated. By reason of the use of a protective circuit 17a for the transistor 17, this can lead to strong recharging currents which destroy the transistor 17.

To prevent this, the time switching element 32 and the OR linking element 30 are provided. The time switching element 32, which is a monostable multivibrator which merely retards the rear flank of its input pulse, is initiated with the front flank (0–1 transition) of the signal $A_1$ so that its output signal B changes from $B_0$ to $B_1$. The 1 signal $B_1$ has a duration corresponding to the required minimum operating time of the switching transistor 17 for preventing capacitively occasioned overcurrents in the transistor 17. By linking the signals A and B in the OR linking element 30, one ensures that the duration of the signal $C_0$, which finally determines the operating or switching on time of the transistor 17, always corresponds to the longer duration of the two signals $A_1$ and $B_1$. If, therefore, the signal $A_1$ shortened by the blocking signal $S_1$ has a shorter pulse duration than the minimum operating time as is shown in FIG. 2, the signal $B_1$ lengthens the signal $C_0$ to a minimum pulse duration corresponding to this minimum operating time.

Apart from the aforementioned advantages, this control device has the further advantage that it avoids acoustic noises of the motor as well as electric spark faults that could be brought about by overcurrents.

What is claimed is:

1. A brushless D.C. motor assembly comprising a rotor and at least two stator windings in parallel branches, semiconductor switching elements in said branches in series with said windings, oppositely directed diodes respectively shunting said switching elements, extingushing circuit means between said branches generating an extinguishing current pulse immediately after each commutation switching operation, a chopper in series with said branches, a sensor for detecting the rotary position of said rotor, commutation control means controllable by said sensor for generating commutation control pulses for said semiconductor elements, speed responsive means controllable by said sensor for generating a signal proportional to the speed of said rotor, chopper control means including signal processing means having first and second inputs, motor regulating means responsive to said speed responsive means for generating a motor regulating waveform having modulated pulses directed to said first input of said signal processing means, said commutation control means generating chopper control pulses coincident with said commutation pulses which are directed to said second input of said signal processing means, said signal processing means operating so that said chopper control pulses override and nullify all parts of said motor regulating waveform formed in time overlap with said chopper control pulses.

2. A brushless D.C. motor assembly according to claim 1 wherein said chopper control pulses are of longer duration than said extinguishing current pulses.

3. A brushless D.C. motor assembly according to claim 1 wherein said signal processing means includes logic means for blocking the effectiveness of said motor regulating waveform during the pulse intervals of said chopper control pulses.

4. a brushless D.C. motor assembly according to claim 1 wherein said signal processing means includes auxiliary means responsive to said motor regulating wave form which are not nullified by said chopper control pulses and forming auxiliary chopper control pulses having a predetermined minimum length for operating said chopper predetemined minimum time periods.

5. A brushless D.C. motor assembly comprising a rotor and at least two stator windings in parallel branches connected to a voltage source, semiconductor switching elements in said branches in series with said windings, extinguishing circuit means between said branches generating an extinguishing current pulse immediately after each commutation switching operation, a chopper in series with said branches, a sensor for detecting the rotary position of said rotar, motor speed regulating means for generating a motor speed regulating waveform, commutation control means controllable by said sensor for generating commutation control pulses for said semiconductor elements, said commutation control means generating a chopper blocking signal pulse at the start of each commutation period and generating a continuous speed signal corresponding to motor speed which is directed to the input of said speed regulating means, and chopper control means including signal processing means for processing output waveform signals from said motor speed regulating means and said blocking signal pulses from said commutating control means, said chopper control means having first and second inputs for processing said chopper blocking signal pulses and said motor speed output waveform signals, said signal processing means operating so that said chopper blocking signal pulses override and nullify all parts of said motor speed regulating waveform formed in time overlap with said chopper blocking signal pulses.

6. A motor assembly according to claim 5 including current measuring means wherein said chopper is controllable in response to motor current via said chopper control means.

7. A motor assembly according to claim 5 including a first pair of oppositely directed diodes respectively shunting said switching elements, and a second pair of diodes respectively in series with and directed in the same direction as said switching elements.

8. A motor assembly according to claim 5 wherein said extinguishing circuit means includes a coil and capacitor in series.

9. A motor assembly according to claim 5 wherein said blocking signal pulse is of sufficient duration that said extinguishing current pulse falls to a permissible value to the end of said pulse.

10. A motor assembly according to claim 5 including auxiliary means responsive to said motor speed regulating waveform for operating said chopper a predetermined minimum interval of time oblivious to the effects of said blocking signal pulses.

11. A motor assembly according to claim 10 wherein said auxillary means is a monostable multivibrator.

12. A motor assembly according to claim 7 including a third pair of diodes extending from the output side of said chopper respectively to and directed in the direction of the anodes of said second pair of diodes.

13. A motor assembly according to claim 12 including coil means between said switching elements and said chopper, and diode means extending from the junction of said chopper and said coil means to and directed in the direction of the junction of said windings with said D.C. voltage source.

* * * * *